United States Patent
Vertenoeuil

(10) Patent No.: US 10,145,305 B2
(45) Date of Patent: Dec. 4, 2018

(54) TURBOMACHINE FUEL CIRCUIT

(71) Applicant: SAFRAN AIRCRAFT ENGINES, Paris (FR)

(72) Inventor: Philippe Vertenoeuil, Paris (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 613 days.

(21) Appl. No.: 14/652,999

(22) PCT Filed: Dec. 9, 2013

(86) PCT No.: PCT/FR2013/052990
§ 371 (c)(1),
(2) Date: Jun. 17, 2015

(87) PCT Pub. No.: WO2014/096620
PCT Pub. Date: Jun. 26, 2014

(65) Prior Publication Data
US 2015/0337736 A1    Nov. 26, 2015

(30) Foreign Application Priority Data
Dec. 18, 2012   (FR) ..................................... 12 62242

(51) Int. Cl.
*F02C 7/232*    (2006.01)
*F02C 7/236*    (2006.01)
(Continued)

(52) U.S. Cl.
CPC .............. *F02C 7/232* (2013.01); *F02C 7/236* (2013.01); *F02C 9/36* (2013.01); *F16K 3/246* (2013.01);
(Continued)

(58) Field of Classification Search
CPC ............... F16K 3/246; F05D 2260/601; F05D 2260/606; F05D 2260/607; Y02T 50/671;
(Continued)

(56) References Cited

U.S. PATENT DOCUMENTS 4,853,123 A * 8/1989 Hayes ................... B01D 29/111
156/294
5,116,362 A * 5/1992 Arline ..................... F02C 7/236
417/203
(Continued)

FOREIGN PATENT DOCUMENTS

| FR | 2 923 861 A1 | 5/2009 |
| FR | 2 928 207 A1 | 9/2009 |
| FR | 2 968 041 A1 | 6/2012 |

OTHER PUBLICATIONS

U.S. Appl. No. 14/109,284, filed Dec. 17, 2013, 2014-0165571, Vertenoeuil, et al.
(Continued)

*Primary Examiner* — Phutthiwat Wongwian
*Assistant Examiner* — Loren Edwards
(74) *Attorney, Agent, or Firm* — Oblon, McClelland, Maier & Neustadt, L.L.P.

(57) ABSTRACT

A fuel circuit of a turbomachine, this circuit including a fuel return valve connected to the main fuel circuit and to a tank, the valve being able to take a first and a second open position, separate from one another, and a closed position, two primary hydraulic lines connecting the valve to the main circuit and including, respectively, first and second filters through which the fuel passes when the valve is in its first open position, two secondary hydraulic lines which connect the valve to the main circuit and which are positioned in relation to the first and second filters in such a way that the circulation of fuel in these secondary lines contributes,
(Continued)

respectively, to the cleaning of the first and second filters, the fuel circulating in the secondary lines when the valve is in its second open position.

10 Claims, 3 Drawing Sheets

(51) Int. Cl.
*F02C 9/36* (2006.01)
*F16K 3/24* (2006.01)

(52) U.S. Cl.
CPC .. *F05D 2260/601* (2013.01); *F05D 2260/606* (2013.01); *F05D 2260/607* (2013.01); *Y02T 50/671* (2013.01); *Y02T 50/675* (2013.01)

(58) Field of Classification Search
CPC . Y02T 50/675; Y02T 10/123; F02M 37/0052; F02M 37/22; F02C 7/22; F02C 7/232; F02C 7/236; F02C 7/224; F02C 9/263

USPC .......................................................... 60/734
See application file for complete search history.

(56) References Cited

U.S. PATENT DOCUMENTS

| 6,619,303 B2 * | 9/2003 | Hultqvist | B01D 35/027 |
| | | | 134/104.1 |
| 2011/0061835 A1 | 3/2011 | Brun | |
| 2014/0165571 A1 | 6/2014 | Vertenoeuil et al. | |

OTHER PUBLICATIONS

International Search Report dated Feb. 6, 2014, in PCT/FR2013/052990, filed Dec. 9, 2013.

* cited by examiner

TURBOMACHINE FUEL CIRCUIT

FIELD OF THE INVENTION

The present disclosure relates to a fuel circuit of a turbomachine, and a turbomachine comprising such a circuit.

For example, it can be a fuel circuit of a terrestrial or aeronautical turbomachine (turboreactor or turbopropeller) and, more particularly, a fuel circuit of an aeroplane turboreactor.

PRIOR ART

A known example of a fuel circuit for an aeroplane turboreactor is represented in the appended FIG. 1. This circuit 1 comprises a main circuit 2 with a low-pressure pump 16 connected to the fuel tank 10 of the aeroplane, a high-pressure pump 18, a heat exchanger 12, and a fuel-metering valve 13 to supply the combustion chamber with fuel 11. The circuit 1 also incorporates a fuel return valve or FRV.

The purpose of the FRV is to return to the tank 10 a certain quantity of hot excess fuel 22 (called "hot fuel") that has travelled through the heat exchanger 12, in order to improve the thermal equilibrium of the system. FRVs are appreciated for their efficiency and small bulk. The temperature of the fuel returned to the tank 10, via the FRV, is reduced by mixing the hot fuel 22, taken between the exchanger 12 and the high-pressure pump 18 (or HP pump), with cold fuel 21 (known as "cold fuel"), taken at the low-pressure pump 16 (or LP pump).

FRVs technology employs small operational clearances, both at the movable valves or the sealing seats generally present in these valves. The valves are used to open, close and regulate the flow of the fuel returned to the tank. As the operational clearances of the FRV are low, they are particularly sensitive to clogging and wear, and must therefore be protected from the impurities present in the fuel. For this reason, the fuel supplying the FRV is filtered beforehand. Thus, in the known example in FIG. 1, the hot fuel 22 is filtered beforehand by a filter 14 (the main filter of the fuel circuit) located at the exchanger 12 and the cold fuel 21 is filtered beforehand by a filter 19 attached to the low-pressure pump 16.

However, the latest generations of aeroplane turboreactor have new architectures wherein the filters 14 and 19 are no longer found.

There is therefore a need for a new solution for filtering the fuel supplying the FRV in order to protect the latter from pollution or contamination, and to preserve its correct operation over the whole of the required lifetime.

PRESENTATION OF THE INVENTION

The present disclosure concerns a fuel circuit of a turbomachine, this circuit comprising:
- a fuel return valve, or FRV, configured to be connected, firstly, to the main fuel circuit of a turbomachine and, secondly, to a fuel tank, the FRV being able to take a first and a second open position, separate from one another, wherein the valve makes it possible to return a quantity of excess fuel originating from the main circuit to the tank, and a closed position wherein the return of fuel to the tank is blocked,
- at least one primary hydraulic line connecting the valve to the main circuit, and comprising a first filter through which the fuel passes to rejoin the valve, this primary line being attached to the valve in such a way that the fuel circulates in this primary line when the valve is in its first open position, and
- at least one secondary hydraulic line which connects the valve to the main circuit and which is positioned in relation to the first filter in such a way that the circulation of fuel in this secondary line contributes to the cleaning of the first filter, this secondary line being attached to the valve in such a way that the fuel circulates in this secondary line when the valve is in its second open position.

The term "hydraulic line" is understood to refer to a system of ducts (e.g. tubes, flexible pipes, etc.) or passages connected together to conduct and transport a liquid, here fuel.

The main circuit corresponds to the part of the fuel circuit dedicated to supplying the combustion chamber of the turbomachine. The fuel circulating there is taken, upstream, in a fuel tank and is injected, downstream, into the combustion chamber. Typically, the main circuit comprises an LP pump, pressurizing an imposed flow rate, and an HP pump imposing the flow rate.

In the present disclosure, the upstream and downstream are defined in relation to the normal direction of flow of the fuel.

According to the present solution, the FRV has a second open position, separate from the first open position and from the closed position. This second open position is also called cleaning position. The FRV switches to the cleaning position and remains in this position for a certain interval of time during which the fuel circulates in the secondary line, and, in doing so, contributes to the cleaning of the first filter. For example, the FRV passes through the cleaning position before switching to the first open position.

The movement of the FRV between the first open position, the second open position and the closed position can be controlled by a control system. This control system can be electrical or hydraulic. For example, in the case of an aeronautical turbomachine, the FRV can be controlled by a servovalve and the FADEC (for "Full Authority Digital Engine Control") of the aircraft. The frequency with which the valve enters the cleaning position can be determined by the logic recorded in the FADEC. For example, this logic can control the FRV's move to the cleaning position for a certain time interval before the FRV changes to the first open position of the flight cycle.

Regular cleaning of the filter is significantly decreased, and, generally, the risk of its clogging is eliminated. It is therefore not necessary to provide a bypass system to circumvent the filter in the event of clogging. In addition, as the FRV is generally used only in conditions where the fuel is hot, the risk of the filter icing is zero and it is also pointless to provide a bypass system to circumvent the filter in the event of icing. Also, advantageously, the circuit is free of a bypass system for getting around the filter. This simplifies the design of the circuit and reduces its weight and bulk.

In certain embodiments, the FRV defines, in its first open position, a first passage to the tank and, in its second open position, a second passage to the tank, the first and second passages being separate. The first passage corresponds to the "normal" passage taken by the fuel to return to the tank and it is in this passage that the sensitive parts of the FRV and, notably, those with low operational clearance are located. As the fuel that passes through the first passage passes through the first filter beforehand, the impurities initially contained in this fuel are filtered and the sensitive parts of the FRV are protected from these impurities: the correct operation of the FRV is thus preserved. The fuel that runs through the second passage is on the contrary loaded with impurities following the cleaning of the filter, but as the second passage forms a specific path, separate from the first passage, there is no risk of the impurities contained in the fuel fouling up the sensitive parts of the FRV.

In certain embodiments, the degree of filtration of the filter is less than or equal to 50 microns, and preferably in the order of 45 microns. The lower the degree of filtration, the quicker the filter clogs up and the more the filter must be cleaned.

In certain embodiments, the FRV comprises a movable valve (movable in translation) between first and second open positions, corresponding to the first and second open positions of the FRV respectively, and a closed position corresponding to the closed position of the FRV. The movement of the valve can be controlled by the aforementioned control system.

In certain embodiments, the second passage passes through the valve.

In certain embodiments, one end of the valve, hereafter called the distal end, comes into contact with a sealing seat when the FRV closes, and the first passage runs between this distal end and the seat.

In certain embodiments, the filter comprises a filtering surface, the filter being arranged in relation to the primary line in such a way that, when the valve is in its first open position, the fuel that circulates in the primary line passes through the filtering surface, and the filter being arranged in relation to the secondary line in such a way that, when the valve is in its second open position (or cleaning position), the fuel that circulates in the secondary line runs alongside the filtering surface, without passing through it. For example, the filtering surface is substantially perpendicular to the flow of fuel circulating in the primary line, and substantially parallel to the flow of fuel circulating in the secondary line.

In certain embodiments, the circuit comprises a pressure regulator, this regulator being arranged on the primary line. This regulator operates when the FRV is in its first open position and returns fuel to the tank. It makes it possible to modulate pressure in the primary line, downstream of the regulator and, thus, to return fuel to the tank with a constant flow rate whatever the pressure at the place where the fuel is taken from the main circuit.

In certain embodiments, the circuit comprises at least two primary lines comprising first and second filters respectively. These two primary lines make it possible to bring fuels at different temperatures to the FRV: a said "hot" fuel and a said "cold" fuel. Typically, the main circuit comprises a heat exchanger, and the first primary line is attached to the main circuit upstream of the exchanger, in order to filter a flow of cold fuel towards the FRV. The second primary line is attached to the main circuit downstream of the exchanger, in order to filter a flow of hot fuel to the FRV.

In certain embodiments, the circuit comprises at least two secondary lines dedicated, respectively, to the cleaning of the first and second filters of the two primary lines.

In certain embodiments, the main circuit comprises a low-pressure pump, a high-pressure pump and, between the two, a heat exchanger. The first primary line is then attached to the main circuit between the low-pressure pump and the exchanger, and the second primary line is attached to the main circuit between the exchanger and the high-pressure pump.

Compared to these solutions, the described solution has the advantage of being simple, of small bulk (an important aspect of latest-generation turboreactors) and of limited weight.

In particular, it makes it possible to simplify the design and manufacture of the elements of the main circuit. For example, by comparison with the known example in FIG. 1, the present solution simplifies the design and manufacture of the LP pump since it is no longer necessary to attach a filter, either to this pump, or to any other item of equipment of the main circuit (which saves one interface and one channel). Furthermore, the fuel supplying the FRV can be taken from the main fuel circuit independently of the presence and/or position of any filters (particularly of the main filter) in this main circuit. Finally, as the filter of each primary line is only dedicated to the filtering of the fuel supplying the FRV, its degree of filtration can be determined according to the specific requirements of the FRV and this degree of filtration does not affect the filter cascade in the main circuit. The fact that the fuel is filtered according to the specific requirements of the FRV can also simplify the design of the FRV, with the consequence of savings in weight and lifetime.

The present solution also obviates the need to incorporate a self-cleaning filter into the FRV. A filter incorporated into the FRV would have drawbacks because the FRV is mounted on the turbomachine, relatively far from the main fuel circuit. Consequently, if a self-cleaning filter was incorporated into the FRV, it would be necessary to provide a long loop of circuit connected to the main circuit and running all the way to the self-cleaning filter to clean it. However, this long additional loop would pose problems of weight and bulk.

The present disclosure also concerns a turbomachine comprising a fuel circuit as described previously.

The aforementioned features and advantages, and others, will appear upon reading the following detailed description of an exemplary embodiment of the proposed fuel circuit. This detailed description refers to the appended drawings.

BRIEF DESCRIPTION OF THE DRAWINGS

The appended drawings are schematic and are not to scale; their main aim is to illustrate the principles of the invention.

On these drawings, from one figure (FIG) to another, identical elements (or parts of elements) are identified by the same reference signs.

DETAILED DESCRIPTION OF EXEMPLARY EMBODIMENT(S)

Exemplary embodiments are described in detail below, with reference to the appended drawings. These examples illustrate the features and advantages of the invention. It is however recalled that the invention is not limited to these examples.

Figure 1:
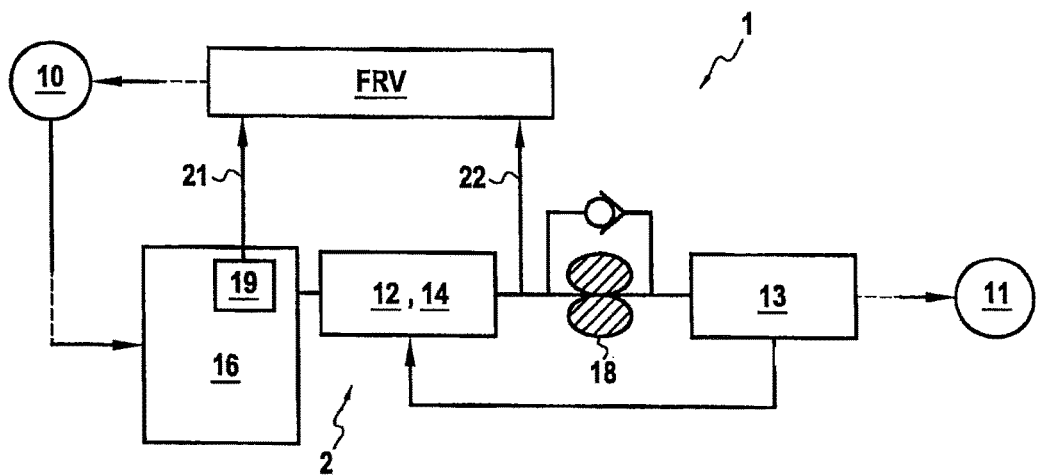
FIG. 1 represents a known example of a turbomachine fuel circuit.

FIG. 1 represents a known example of an aeroplane turboreactor fuel circuit. This circuit has already been described above.

Figure 2:
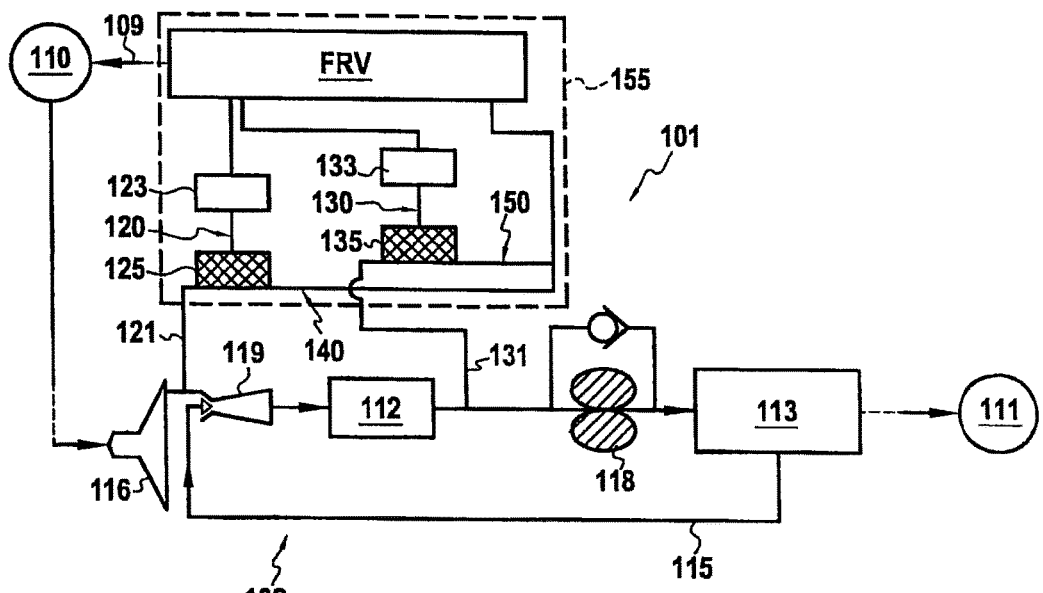
FIG. 2 represents an example of a turbomachine fuel circuit according to the present disclosure.

FIG. 2 represents a turbomachine fuel circuit 101, more specifically of an aeroplane turbomachine. This circuit 101 comprises a main circuit 102 extending between the fuel tank 110 of the aeroplane and the combustion chamber 111 of the turbomachine.

The main circuit 102 comprises, from upstream to downstream: a low-pressure pump (or LP pump) 116 connected to the tank 110, a jet pump 119, a heat exchanger 112, a high-pressure pump (or HP pump) 118, and a fuel-metering valve 113 to supply the combustion chamber 111 with fuel. A filter (not represented) can be provided between the HP pump 118 and the fuel-metering valve 113.

A re-circulating loop 115 returns an excess quantity of fuel from the fuel-metering valve 113 to the jet pump 119. The jet pump 119 drives the flow of low-pressure fuel using the flow of excess high-pressure fuel, returned by the fuel-metering valve 113 in the loop 115. This increase in speed is then reconverted into pressure using the diffuser of the jet pump 119. The jet pump 119 is activated or not according to the flight point.

The circuit 101 also comprises an FRV which returns to the tank 110 a quantity of hot excess fuel 131 that has travelled through the heat exchanger 112. The temperature of the fuel returned to the tank 110, via the FRV, is reduced by mixing the hot fuel 131 taken downstream of the exchanger 112 with cold fuel 121 taken upstream of the exchanger 112.

Unlike the circuit in FIG. 1, the circuit 101 does not comprise a main filter associated with the exchanger 112, or any filter associated with the LP pump 116. On the other hand, the circuit comprises first and second filters 125, 135 respectively integrated into first and second primary hydraulic lines 120, 130 connecting the FRV to the main circuit 102. Note that the FRV of the circuit 101 differs from that of the circuit 1 in FIG. 1, the FRV in FIGS. 2 and 3 defining several fuel passages, as explained below.

The first primary line 120, also called "cold line", is used for the circulation of the cold fuel 121 and connects the FRV to the main circuit 102. It comprises, from upstream to downstream, the filter 125 and a pressure regulator 123. This cold line 120 is attached to the main circuit 102 upstream of the exchanger 112, between the LP pump 116 and the jet pump 119.

The second primary line 130, also called "hot line", is used for the circulation of the hot fuel 130 and connects the FRV to the main circuit 102. It comprises, from upstream to downstream, the filter 135 and a pressure regulator 133. This hot line 130 is attached to the main circuit 102 between the exchanger 112 and the LP pump 118.

In addition to the primary lines 120, 130, the circuit comprises two secondary hydraulic lines 140, 150, each secondary line connecting the FRV to the main circuit 102.

The first secondary line 140 is positioned in relation to the first filter 125 in such a way that the circulation of fuel in this line 140 contributes to the cleaning of the filter 125. In the example, the line 140 is made up of three sections, a first section 141 shared with the cold line 120 and extending from the main circuit 102 to a junction 143 located at the filter 125, a second section 142 of its own extending from the junction 143 to another junction 144, and a third section 145 shared with the second secondary line 150 extending from the junction 144 to the FRV. At the junction 143, the cold line 120 (i.e. its section 141) is divided into two arms: one arm corresponding to the extension of the cold line 120 and another arm corresponding to the rest of the secondary line 140. At the junction 144, the secondary lines 140, 150 meet at a common position 145 connected to the FRV.

The second secondary line 150 is positioned in relation to the second filter 135 in such a way that the circulation of fuel in this line 150 contributes to the cleaning of the filter 135. In the example, the line 150 is made up of three sections, a first section 151 shared with the hot line 130 and extending from the main circuit 102 to a junction 153 located at the filter 135, a second section 152 of its own extending from the junction 153 to the junction 144, and a third section 145 shared with the first secondary line 140 extending from the junction 144 to the FRV. Of course, the lines 140, 150 could have different architectures as long as they allow the cleaning of the filters 125, 135.

The FRV, the first pressure regulator 123, the second pressure regulator 133, the first filter 125, the second filter 135, and the secondary lines 140, 150, can form an indivisible whole, hereinafter called "fuel return system" 155. The fuel return system 155 can appear in the form of a single component with two fuel inlets (one hot fuel inlet and one cold fuel inlet) and a fuel outlet to the tank 110. The elements of the fuel return system 155 can be protected by one and the same casing. The fuel return system 155 can be mounted on the turbomachine.

In the example, the filters 125, 135 are identical. For example, these filters can be strainers. The first filter 125 is arranged in relation to the first primary line 120 and to the first secondary line 140 as follows. The filter 125 is arranged at the junction 143. The filtering surface 126 of the filter 125 is arranged crosswise in the line 120 just downstream of the junction 143, in such a way that the fuel 121 circulating in the line 120, in the direction of the FRV, passes through the filtering surface 126. Additionally, the secondary line 140 runs along the filtering surface 126 in such a way that the fuel circulating in the line 140, in the direction of the FRV, circulates along the filtering surface 126, without passing through it. Thus, the impurities captured by the filtering surface 126 are detached from the latter under the effect of the flow of the fuel in the line 140. The second filter 135 is arranged in relation to the second primary line 130 and to the second secondary line 150 in the same way.

The FRV comprises a valve 160, also called slide valve, movable in translation along an axis A. The valve 160 is mounted slidably in a sheath 164 surrounding the outside of the valve 160 and running along the axis A. The downstream end 161 of the valve 160 rests on a sealing seat 166. This seat 166 has an aperture 165 communicating with the hydraulic line 109 leading to the tank 110.

Figure 4:
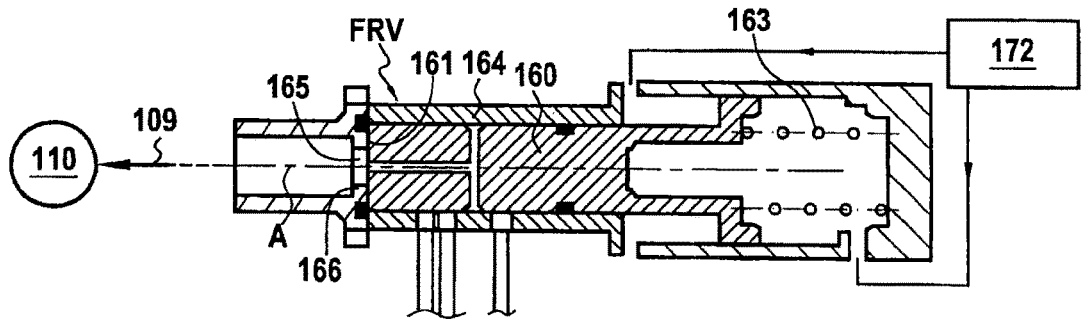
FIGS. 4 to 6 represent various positions of the FRV in FIG. 3.
Figure 5:
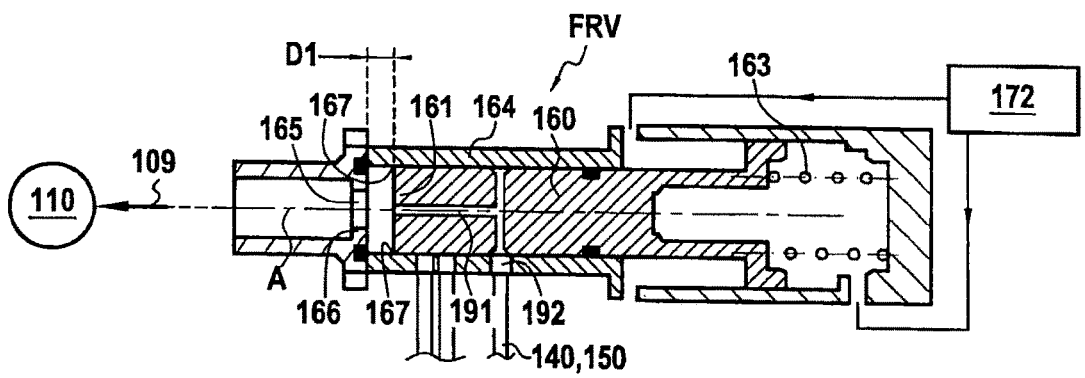
Figure 6:
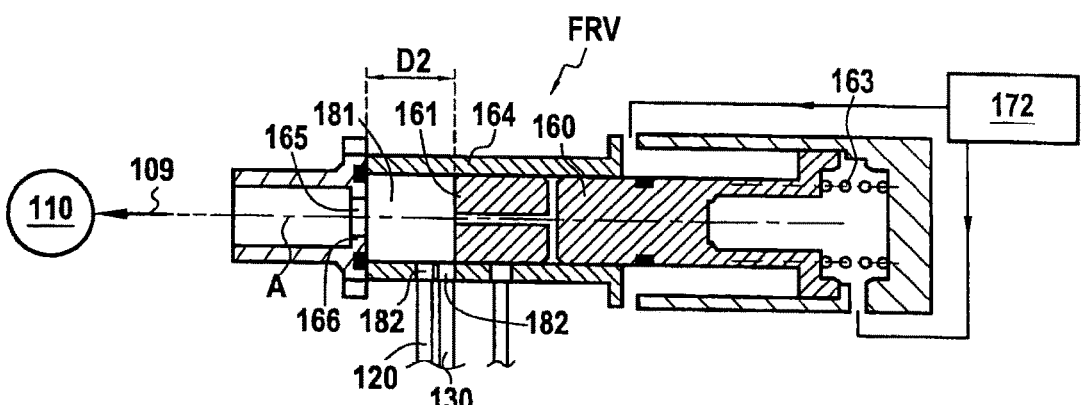

The valve 160 is movable between three positions represented in FIGS. 4 to 6. The valve 160 is moved from one position to another by the action of a control system 172. In its closed position, represented in FIG. 4, the end 161 of the valve 160 closes the aperture 165, thus blocking the return of fuel to the tank 110. The valve 160 is, moreover, mounted on a spring 163 pushing the valve 160 into its closed position. The control device 172 must therefore generate a force greater than the spring force of the spring 163 to open the FRV.

In its first open position, represented in FIG. 6, the end 161 of the valve 160 is distant from the aperture 165 (distance D2) and does not close it. A first passage 181 to the tank 110 is thus defined between the distal end 161 of the valve 160 and the seat 166. This first passage 181 communicates, on one side, with the primary lines 120, 130 via apertures 182 made in the sheath 164, and on another side, with the hydraulic line, 109 to the aperture 165.

In its second open position, represented in FIG. 5, the end 161 of the valve 160 is distant from the aperture 165 and does not close it, but the distance D1 separating the end 161 from the aperture 165 in the second open position (see FIG. 5) is less than the distance D2 separating the distal end 161 of the valve 160 from the aperture 165, in the first open position (see FIG. 6). The second open position is therefore an intermediate position between the closed position and the first open position.

A second passage 191 is made inside the valve and passes through it. This second passage opens at the distal end 161 of the valve in such a way that, in the second open position (see FIG. 5), the exit of the second passage 191 faces the aperture 165. The passage 191 also opens onto a side face of the valve 160 in such a way that, in the second open position (see FIG. 5), the entrance of the passage 191 communicates with the secondary lines 140, 150 (i.e. with the section 145 shared by these lines), via an aperture 192 made in the sheath 164.

During the phases of operation of the turbomachine in which the FRV is in its closed position (see FIG. 4), no fuel is returned to the tank 110.

During the phases of operation when the FRV is in its first open position (see FIG. 6), a mixture of hot fuel 131 and cold fuel 121 is returned to the tank 110, via the FRV. This mixture of fuel runs along the primary lines 120, 130, the first passage 181 and the line 109. Before reaching the FRV, the fuel therefore passes through each of the filters 125, 135 in such a way that the fuel is rid or cleansed of its impurities (i.e. impurities of a size deemed to be too large are captured by the filters) before reaching the FRV. In this way, the FRV is protected from pollution and its correct operation is preserved through its whole lifetime.

During the phases of operation when the FRV is in its second open position (see FIG. 5), and in operating conditions when the difference in pressure between primary lines is relatively small, a mixture of fuel is returned to the tank 110, via the FRV, but this mixture does not take the same path as when the FRV is in its first open position. Specifically, the fuel takes the secondary lines 140, 150, the second passage 191 and the line 109. This fuel is not filtered before reaching the FRV. On the contrary, the fuel becomes loaded with impurities by circulating along the lengths of the filters 125, 135: the impurities previously captured by the 125 or 135 are detached due to the flow of fuel along the filtering surfaces 126, 136, and these impurities are carried away on the secondary lines 140, 150 in the direction of the FRV. The filters 125 and 135 are thus cleaned. In the FRV, the fuel takes the second passage 191 and, due to the pressure, leaves the passage 191 by passing directly through the aperture 165. The fuel loaded with impurities does not therefore come into contact with the sensitive parts of the FRV such as the seat 166 or the peripheral interface 167 between the valve 160 and the sheath 164. The sensitive parts of the FRV are thus preserved.

Note that the first filter 125 is more subject to fouling than the second filter 135, because the filter 125 is generally passed through by unfiltered or poorly filtered fuel. The second filter 135 is also generally passed through by unfiltered or poorly filtered fuel, but this fuel is diluted in a greater volume corresponding to the volume of fuel in the re-circulating loop 115 (see FIG. 2). Conventionally, the flow rate in the re-circulating loop 115 is at least five times greater than the flow rate in the injection line. The impurity concentration of the fuel reaching the filter 135 is therefore often at least five times smaller than that of the fuel reaching the filter 125. For this reason in particular, it is possible to provide different filters 125 and 135 and/or different cleaning systems for the two filters 125 and 135. For example, in certain embodiments (not represented), only the first secondary line 140 is provided for the cleaning of the first filter 125, the circuit not having any secondary line 150.

Note that the impurities accumulate gradually over a certain time in the filters 125, 135 but that the cleaning of the filters requires a great deal less time in comparison. This does not therefore pose the problem of having to wait the time required for the cleaning of the filters 125, 135 (particularly from the point of view of the management of the thermal equilibrium of the system), this time being relatively short.

Note also that the filters 125, 135 are washed when there is no flow of fuel traversing their filtering surface 126, 136 (in other words, when the valve is in its second open position, fuel circulates in the secondary lines 140, 150, but not in the primary lines 120, 130). This thereby removes the constraint of having to use self-cleaning filters, which are only fully efficient when the flow traversing their filtering surface is greatly lower than the flow passing along this surface.

Figure 3:
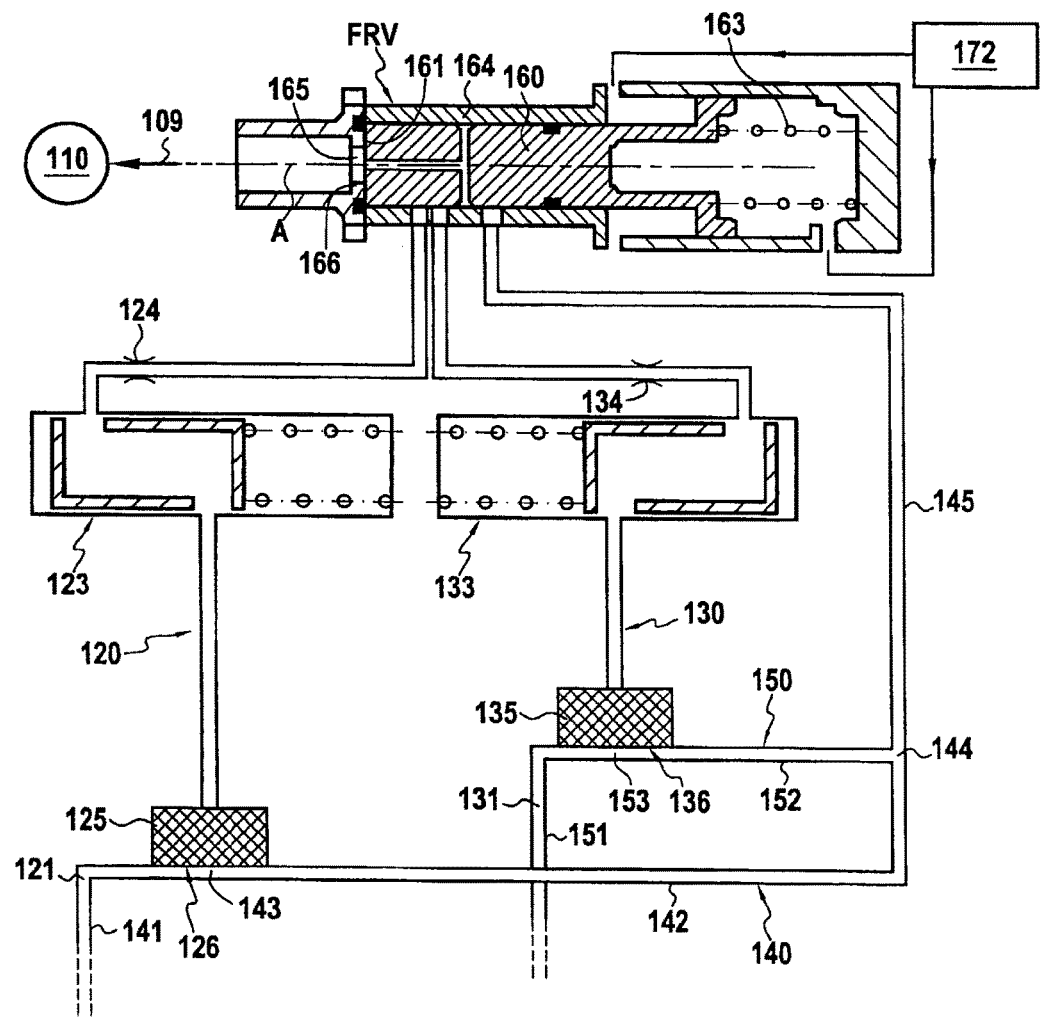
FIG. 3 is a detail view of the circuit in FIG. 2.

Downstream of the filters 125, 135, the hot and cold primary lines 120, 130 also comprise, respectively, first and second pressure regulators 123, 133, and first and second restrictions 124, 134 (see FIG. 3). The two regulators 123, 133, represented in detail in FIG. 3, only operate when the FRV is in the open position and return fuel to the tank 110, via the return line 109.

The embodiments or exemplary embodiments described in the present disclosure are given for illustrative and non-limiting purposes, the person skilled in the art being easily able, on the basis of this disclosure, to modify these embodiments or exemplary embodiments, or envisage others thereof, while remaining within the scope of the invention.

In additional, the various features of these embodiments or exemplary embodiments can be used alone or combined with each other. When they are combined, these features can be combined as described above or differently, the invention not being limited to the specific combinations described in the present disclosure. In particular, except specifications to the contrary, a feature described in relation to an embodiment or an exemplary embodiment can be applied in a similar way to another embodiment or exemplary embodiment.

The invention claimed is:

1. A fuel circuit of a turbomachine, said circuit comprising:
   a fuel return valve configured to be connected, firstly, to a main fuel circuit of a turbomachine and, secondly, to a fuel tank which is separate from the valve, the valve being configured to take a first and a second open position, separate from one another, wherein the valve is configured to return to the tank a quantity of excess fuel originating from the main circuit, and a closed position wherein the return of fuel to the tank is blocked,
   at least one primary hydraulic line connecting the valve to the main circuit and comprising a first filter through which the fuel passes to rejoin the valve, said primary line being attached to the valve in such a way that the fuel circulates in said primary line when the valve is in said first open position,
   at least one secondary hydraulic line which connects the valve to the main circuit and which is positioned in relation to the first filter in such a way that the circulation of fuel in said secondary line contributes to the cleaning of the first filter, said secondary line being attached to the valve in such a way that the fuel circulates in said secondary line when the valve is in said second open position.

2. The fuel circuit according to claim 1, wherein the valve defines, in said first open position, a first passage to the tank, and wherein the valve defines, in said second open position, a second passage to the tank, separate from the first passage.

3. The fuel circuit according to claim 2, wherein the valve comprises a slide movable between first and second open positions, corresponding to the first and second open positions of the valve respectively, and a closed position corresponding to the closed position of the valve.

4. The fuel circuit according to claim 3, wherein the second passage runs inside the valve and passes through said slide.

5. The fuel circuit according to claim 3, wherein one end of said valve comes into contact with a sealing seat when said valve closes, and wherein the first passage runs between said one end and the seat.

6. The fuel circuit according to claim 1, wherein the filter comprises a filtering surface, the filter being arranged in relation to the primary line in such a way that, when the valve is in said first open position, a fuel that circulates in the primary line passes through the filtering surface, and the filter being arranged in relation to the secondary line in such a way that, when the valve is in said second open position, a fuel that circulates in the secondary line runs alongside the filtering surface, without passing through said filtering surface.

7. The fuel circuit according to claim 1, wherein the degree of filtration of the filter is less than or equal to 50 microns and preferably in the order of 45 microns.

8. The fuel circuit according to claim 1, comprising two additional primary lines comprising first and second additional filters respectively.

9. The fuel circuit according to claim 8, comprising two additional secondary lines dedicated to the cleaning of the first and second filters respectively.

10. A turbomachine comprising a fuel circuit according to claim 1.

* * * * *